(12) United States Patent  (10) Patent No.: US 7,679,863 B2
Hashimoto et al. (45) Date of Patent: Mar. 16, 2010

(54) MAGNETIC HEAD SLIDER WITH TRAILING RAIL SURFACE FOR FLYING HEIGHT CONTROL

(75) Inventors: Kiyoshi Hashimoto, Kanagawa (JP); Hidekazu Kohira, Kanagawa-ken (JP); Takanori Yamazaki, Kanagawa-ken (JP); Koji Miyake, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 600 days.

(21) Appl. No.: 11/516,828

(22) Filed: Sep. 6, 2006

(65) Prior Publication Data

US 2007/0058296 A1    Mar. 15, 2007

(30) Foreign Application Priority Data

Sep. 9, 2005 (JP) .............................. 2005-261831

(51) Int. Cl.
*G11B 5/60* (2006.01)
(52) U.S. Cl. ............... 360/235.7; 360/235.8; 360/236.3
(58) Field of Classification Search .............. 360/235.7, 360/235.8, 236.3, 236.5, 237
See application file for complete search history.

(56) References Cited

U.S. PATENT DOCUMENTS

| | | | | |
|---|---|---|---|---|
| 5,940,249 | A * | 8/1999 | Hendriks ................. | 360/235.6 |
| 6,057,983 | A | 5/2000 | Kajitani | |
| 6,556,381 | B2 * | 4/2003 | Kohira et al. ............ | 360/236.3 |
| 6,809,904 | B2 * | 10/2004 | Boutaghou et al. ....... | 360/235.8 |
| 7,095,587 | B2 | 8/2006 | Kurita et al. | |
| 2002/0089790 | A1 * | 7/2002 | Stoebe et al. ............ | 360/236.3 |
| 2003/0053253 | A1 * | 3/2003 | Mundt et al. ............. | 360/236.3 |
| 2003/0058578 | A1 * | 3/2003 | Boutaghou et al. ....... | 360/235.8 |
| 2003/0099054 | A1 * | 5/2003 | Kamijima ................ | 360/59 |
| 2005/0013501 | A1 | 1/2005 | Kang et al. | |
| 2005/0207065 | A1 * | 9/2005 | Takagi ..................... | 360/235.8 |
| 2006/0092570 | A1 * | 5/2006 | Payne et al. ............. | 360/236.5 |

(Continued)

FOREIGN PATENT DOCUMENTS

JP        05-020635      1/1993

(Continued)

*Primary Examiner*—Jefferson Evans
(74) *Attorney, Agent, or Firm*—Townsend and Townsend and Crew LLP; John Henkhaus

(57) ABSTRACT

Embodiments of the invention provide a slider structure able to lower a flying height compensation ratio caused by a projecting deformation of an air bearing surface of a slider by a flying height control mechanism and afford a change in flying height with a low control power. In one embodiment, a slider is provided with a leading edge, an air bearing surface, and a trailing edge. The air bearing surface includes a front pad, the front pad being made up of a front step bearing surface, leading rail surfaces, and side step bearing surfaces. The air bearing surface also includes a negative pressure groove surface surrounded by the front pad. The air bearing surface further includes a rear pad, the rear pad being made up of a rear step bearing surface formed at the same depth as the depth of the front step bearing surface and positioned on the trailing edge side, a trailing rail surface, an intermediate groove deeper than the trailing rail surface, and a trailing pad surface lying at the same height as the trailing rail surface. The front and both sides of the trailing pad surface are surrounded by the trailing rail surface.

23 Claims, 15 Drawing Sheets

U.S. PATENT DOCUMENTS

| | | | |
|---|---|---|---|
| 2006/0139810 A1* | 6/2006 | Hashimoto et al. | 360/235.8 |
| 2006/0238922 A1* | 10/2006 | Hanyu | 360/235.8 |
| 2006/0245111 A1* | 11/2006 | Huang | 360/235.7 |
| 2007/0019329 A1* | 1/2007 | Yao et al. | 360/236.3 |

FOREIGN PATENT DOCUMENTS

| | | |
|---|---|---|
| JP | 2000-353370 | 12/2000 |
| JP | 2005-018985 | 1/2005 |

\* cited by examiner

Distance from the element (mm)

MAGNETIC HEAD SLIDER WITH TRAILING RAIL SURFACE FOR FLYING HEIGHT CONTROL

CROSS-REFERENCES TO RELATED APPLICATIONS

This application claims priority from Japanese Patent Application No. JP2005-261831, filed Sep. 9, 2005, the entire disclosure of which is incorporated herein by reference.

BACKGROUND OF THE INVENTION

The present invention relates to a magnetic head slider and a magnetic disk drive carrying the magnetic head slider thereon. More particularly, the present invention is concerned with the shape of an air bearing surface of a magnetic head slider.

A magnetic head slider, which is adapted to fly over a rotating disk recording medium while maintaining a slight spacing (flying height) with respect to the disk, is used in a magnetic disk drive. Usually, the magnetic head slider is provided at a trailing edge of a slider with a magnetic transducer for write and read of information to and from a disk recording medium. In order to enhance the memory capacity, it is required for a magnetic disk drive to further increase the bit (recording in the circumferential direction) density and track (recording in the radial direction) density. In particular, as one technique for increasing the bit density, it is required to cause a slider to fly in a low flying height as close as possible to the disk recording medium.

At present, one of the effective methods for satisfying such a strict requirement for a low flying height is to use a magnetic head slider provided with a mechanism for controlling the flying height of a magnetic transducer and the vicinity thereof, as disclosed in Patent Document 1 (Japanese Patent Laid-Open No. Hei 5-20635). In this method, when the magnetic transducer of the magnetic head slider reads information stored on a disk recording medium, the magnetic transducer is heated with a heater or the like formed in the vicinity thereof and is approximated toward the disk recording medium by utilizing the resulting heat deformation. On the other hand, when writing information onto the disk recording medium, the magnetic transducer approaches the disk temporarily by utilizing a spontaneous heat deformation caused by an electric current flowing in the magnetic transducer. According to this method, the magnetic transducer can be approximated temporarily to the disk recording medium only at the time of writing or reading information to or from the disk recording medium. When the magnetic transducer does not perform an information write or read operation, the flying height can be set relatively high. Therefore, variations in flying height attributable to the manufacturing process of the magnetic head slider and the magnetic disk drive and changes in flying height caused by changes in pressure and temperature can be tolerated in wide ranges. Consequently, both a low flying height for improving the magnetic recording capacity and the improvement in reliability of the magnetic disk drive can be attained at the same time.

In Patent Document 2 (Japanese Patent Laid-Open No.2001-297421) is disclosed a technique of making the flying height almost uniform throughout the whole surface of a magnetic disk and decreasing a change in flying height in a high land. This technique is characterized in that there are disposed a rail surface including a magnetic transducer and a rail surface at a front position on a leading side of the rail surface through a groove surface. Also proposed is a shape of an air bearing surface wherein the rail surface subsequent to the leading side is once constricted in width at a position just before the magnetic transducer.

In the magnetic head slider having a flying height control mechanism in the vicinity of the magnetic transducer, which is described in Patent Document 1, however, when the flying height control mechanism is operated, the air bearing surface located near the magnetic transducer is projected and deformed out of plane, causing a change in the state of generation of a flying force on the air bearing surface. The change in the flying force caused by a deformation in the direction in which the projection of the air bearing surface increases acts in a direction to increase the flying height near the magnetic transducer. The amount of this increase of the flying height with an increase of the flying force offsets the amount of decrease of the flying height caused by the projection. Therefore, a larger control power is needed if an attempt is made to obtain a desired decrease of the flying height. Such an increase of the control power is not desirable for the magnetic disk drive for which the operation at a low power consumption is required more and more strongly. Further, a smaller magnetic head slider used in a small-sized magnetic disk drive has a tendency that an area ratio of the projectingly deformed region on the air bearing surface increases and so increases the offset ratio in flying height caused by deformation.

Therefore, a lower power consumption of the flying height control mechanism is required in order to attain a lower power consumption of the magnetic disk drive. For the air bearing surface of the slider it is required to provide a slider structure able to lower the offset ratio of flying height caused by projecting deformation and afford a change in flying height caused by a low control power.

According to the technique described in Patent Document 2, it is possible to decrease somewhat the offset ratio of flying height. However, the portion which generates the highest pressure on the air bearing surface lies on the rail surface including the magnetic transducer and there occurs a change in flying force caused by projecting deformation, not attaining a fundamental air bearing surface structure able to decrease greatly the offset ratio of flying height. Further, since the generated pressure is offset to the center of the slider as a whole, there exists a situation where an increase of variations in flying height attributable to the longitudinal shape of the air bearing surface, i.e., crown, or to a lowering of pitch rigidity must be suppressed.

BRIEF SUMMARY OF THE INVENTION

It is a feature of the present invention to decrease the offset ratio in flying height of a magnetic head slider having a flying height control mechanism.

According to an aspect of the present invention, a magnetic head slider comprises a leading edge, an air bearing surface, and a trailing edge. The air bearing surface includes a leading rail surface formed on the leading edge side, a leading-side step bearing surface formed between the leading edge and the leading rail surface, a trailing pad surface formed on the trailing edge side and having a magnetic transducer integral with a flying height control mechanism, a trailing rail surface formed on both sides of the trailing pad surface along the trailing edge, a trailing-side step bearing surface formed on the leading edge side of the trailing rail surface, and a negative pressure groove surface formed between the leading rail surface and the trailing rail surface. The negative pressure groove surface is deeper than each of the step bearing surfaces, and each of the step bearing surfaces is deeper than each of the rail surfaces and the pad surface.

According to the present invention it is possible to decrease the offset ratio in flying height of a magnetic head slider having a flying height control mechanism.

DETAILED DESCRIPTION OF THE INVENTION

Figure 1:
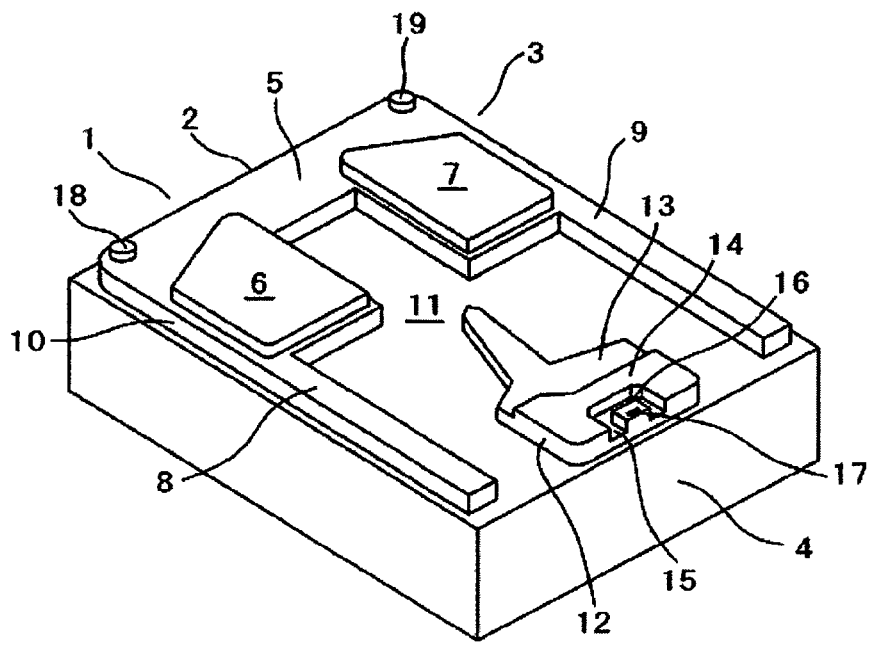
FIG. 1 is a perspective view of a magnetic head slider according to a first embodiment of the present invention.
Figure 2:
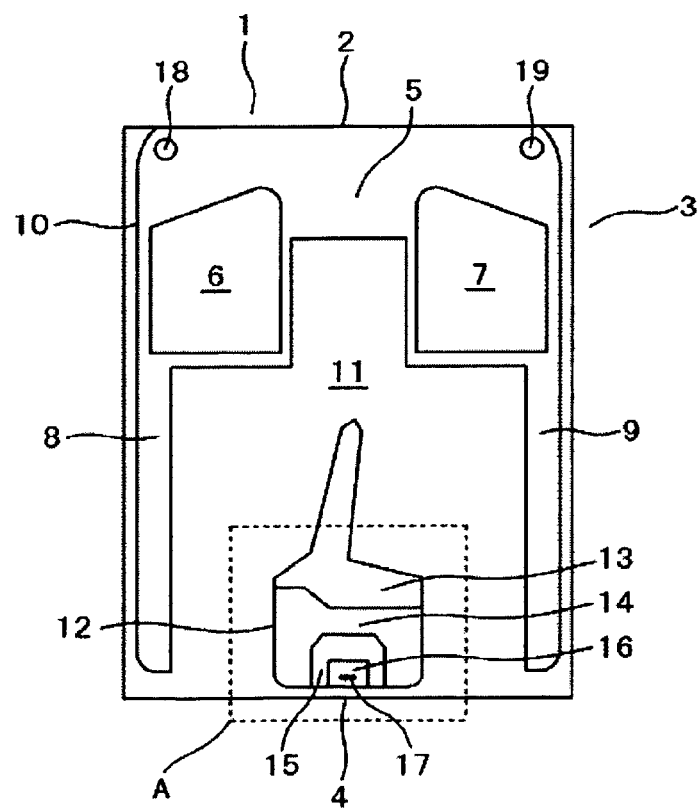
FIG. 2 is a plan view of the magnetic head slider of the first embodiment.

FIGS. 1 and 2 are a perspective view and a plan view, respectively, of a magnetic head slider according to a first embodiment of the present invention. The magnetic head slider (slider) 1 has a length of 1.25 mm, a width of 1.0 mm and a thickness of 0.3 mm. The slider 1 includes a leading edge 2, an air bearing surface 3, and a trailing edge 4. The air bearing surface 3 includes a front pad 10, the front pad 10 being made up of a leading-side step bearing surface (front step bearing surface) 5 contiguous to the leading edge 2, leading pads 18 and 19 formed on both sides of the leading edge 2 in the front step bearing surface 5, leading rail surfaces 6 and 7 contiguous to the front step bearing surface 5, and side step bearing surfaces 8 and 9 having the same depth as the depth of the front step bearing surface 5. The air bearing surface 3 also includes a negative pressure groove surface (deep groove surface) 11 surrounded by the front pad 10. The air bearing surface 3 further includes a rear pad 12, the rear pad 12 being made up of a trailing-side step bearing surface (rear step bearing surface) 13 positioned on the trailing edge 4 side of the magnetic head slider 1 and formed at the same depth as that of the front step bearing surface 5, a trailing rail surface 14 contiguous to the trailing-side step bearing surface 13, a groove (intermediate groove) 15 deeper than the trailing rail surface 14, and a trailing pad surface 16 of the same height as the trailing rail surface 14. The trailing pad surface 16 is surrounded at its front and both sides by the trailing rail surface 14. A magnetic transducer 17 for write and read of information to and from a disk recording medium 25 is provided on the trailing pad surface 16 of the rear pad 12. The magnetic transducer 17 includes a local heating circuit such as a heater and is also provided with a mechanism for controlling the flying height by utilizing, for example, a heat deformation to the outside of the air bearing surface 3. Of course, the flying height control mechanism is not limited to the one utilizing such a heat deformation, but may be any other mechanism insofar as the mechanism adopted can induce a deformation to the outside of the air bearing surface 3.

Figure 3:
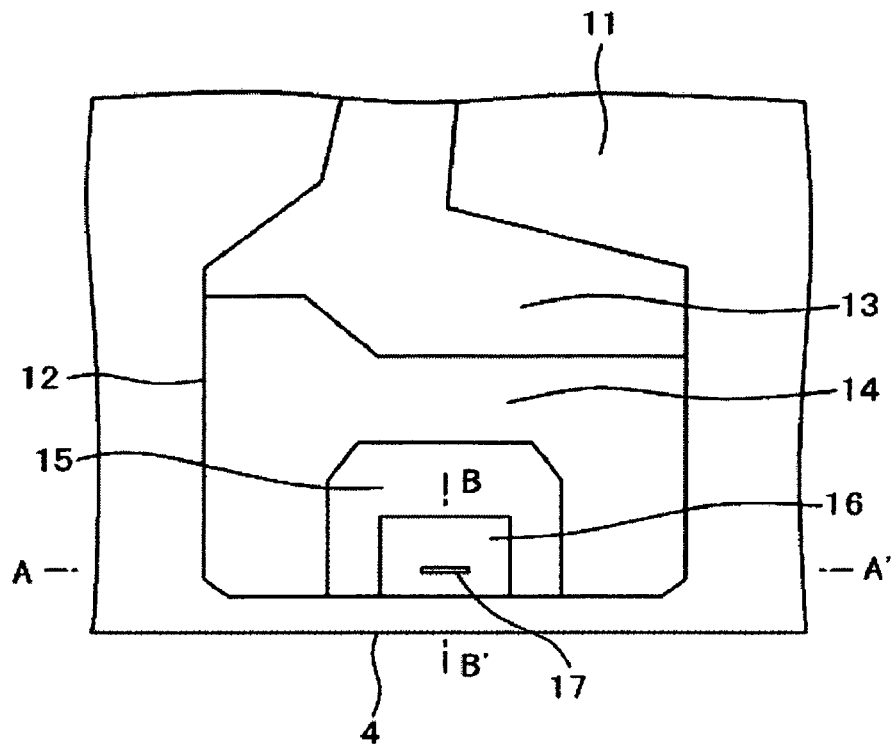
FIG. 3 is an enlarged plan view of portion A in FIG. 2.
Figure 4:
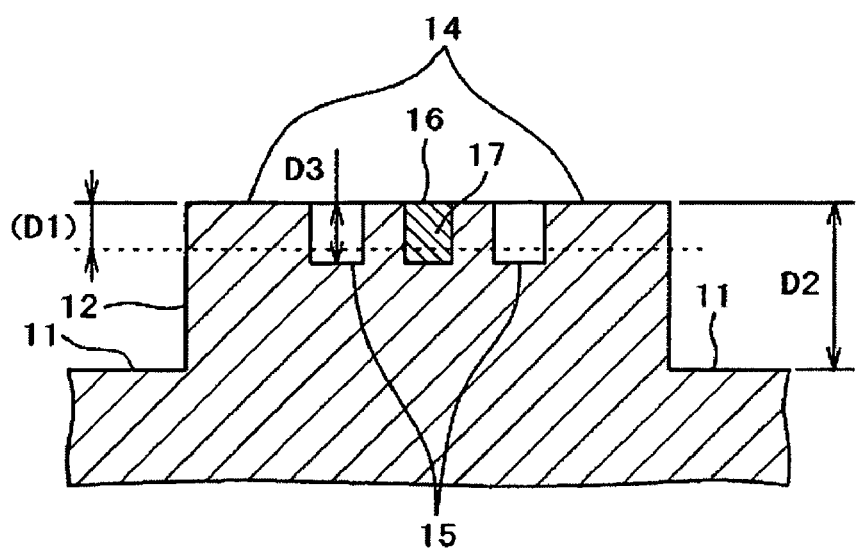
FIG. 4 is a sectional view taken along line A-A' in FIG. 3.

FIG. 3 is an enlarged diagram of a rectangular region A including the rear pad 12 shown in FIG. 2. FIG. 4 is a sectional view taken along line A-A' in FIG. 3, showing schematically a relative relation among the trailing rail surface 14, intermediate groove 15 and deep groove surface 11. With respect to the leading rail surfaces 6, 7, trailing rail surface 14 and trailing pad surface 16, the depth D1 of each of the front and side step bearing surfaces 5, 8, 9 is 150 nm, the depth D2 of the deep groove surface 11 is 0.9 μm, and the depth D3 of the intermediate groove 15 is 200 nm. The A-A' line corresponds to a distance in the longitudinal direction of the magnetic head slider 1 of 1.21 mm, i.e., an approximate position where the magnetic transducer 17 is formed. In the first embodiment shown in FIG. 4, the depth D3 of the intermediate groove 15 is set larger than the depth D1 of the step bearing surfaces. The depth D3 of the intermediate groove 15 may be set arbitrarily insofar as the same groove is deeper than the trailing rail surface 14 and the trailing pad surface 16. Even if the depth D3 is the same as or different from the depth D1 of the step bearing surfaces or the depth D2 of the deep groove, there occurs no problem. The front, side and rear step bearing surfaces 5, 8, 9, 13, the deep groove surface 11 and the intermediate groove 15 in the slider 1 according to the first embodiment are formed by etching such as ion milling or RIE. From the standpoint of manufacturing cost, it is preferable that the intermediate groove 15 be formed in the same process as that of the front, side and rear step bearing surfaces 5, 8, 9, and 13. However, as will be referred to later, it is necessary to give consideration to the shape of a slant surface formed between the trailing pad surface 16 and a bottom surface of the intermediate groove 15.

Figure 5:
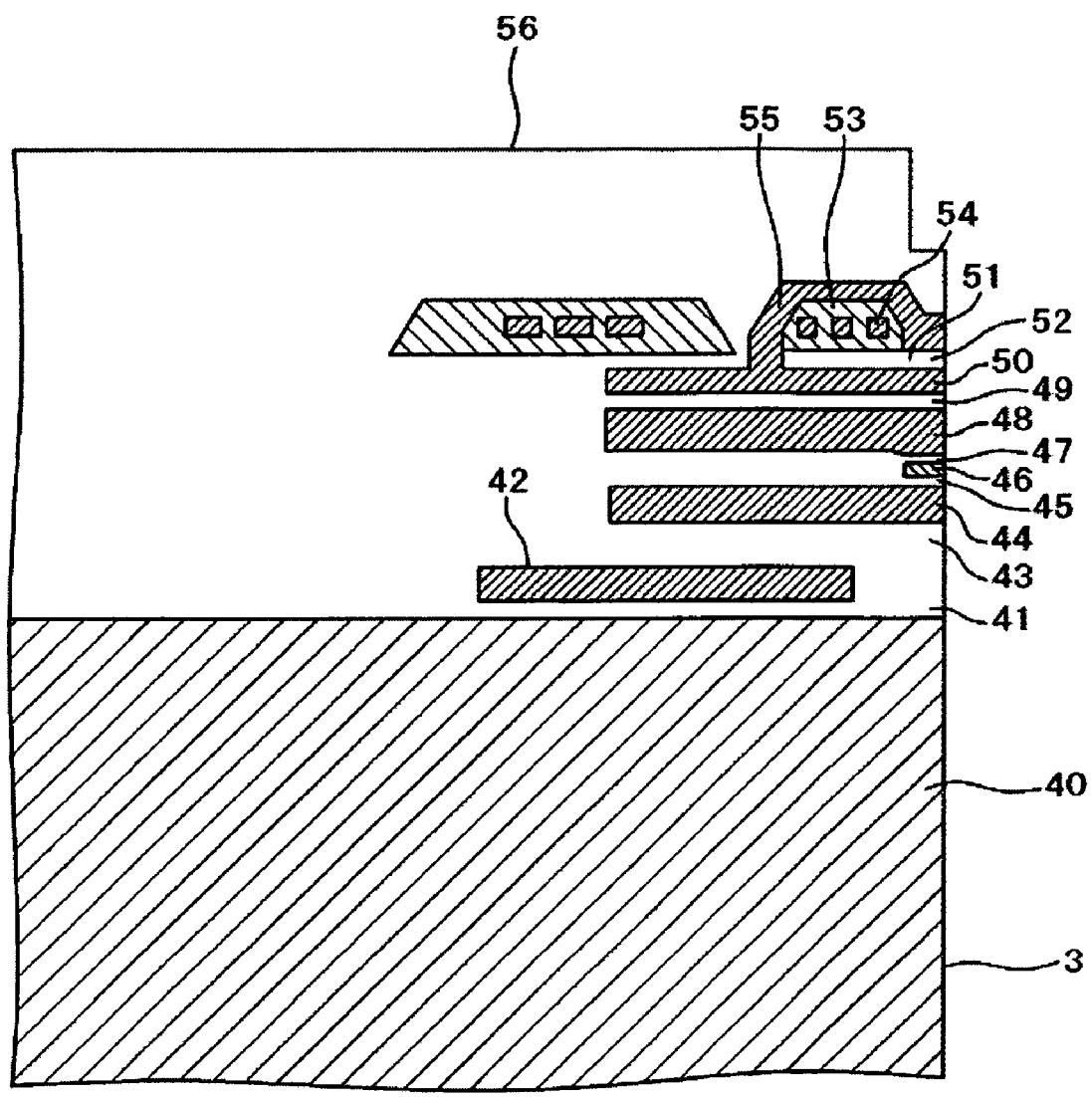
FIG. 5 is a sectional view of a magnetic transducer portion of the magnetic head slider of the first embodiment.

FIG. 5 is a sectional view of the magnetic transducer and the flying height control mechanism. An insulating layer 41 such as a layer of alumina is formed on a slider substrate 40, a flying height control mechanism (a heater constituted by a thin film resistor) 42 is provided on the insulating layer 41 at a position retreated from the air bearing surface 3, and an insulating layer 43 such as a layer of alumina is formed on the heater 42. A lower magnetic shield layer 44, a lower gap layer 45, a read element 46, e.g., GMR, an upper gap layer 47, and an upper magnetic shield layer 48, serving as a read head, are stacked in this order on the insulating layer 43. A separation layer 49 formed of an insulator, e.g., alumina, is formed on the upper magnetic shield layer 48. Further, a lower magnetic pole piece layer 50, a magnetic gap layer 51, an interlayer insulator 53, a conductor coil 54 in the interlayer insulator 53, and an upper magnetic pole piece layer 55, serving as a write head, are stacked in this order over the separation layer 49. On the air bearing surface 3 side of the lower and upper magnetic pole piece layers 50, 55 is formed a magnetic gap 52 which is spaced by the magnetic gap layer 51. Thus, a rear end portion is magnetically shorted to constitute a closed magnetic circuit. Further provided is a protective layer 56 such as an alumina layer which covers the above laminate. In such an integral combination of the magnetic transducer and the heater 42 as the flying height control mechanism, by supplying an electric current to the heater 42 from a control circuit in a magnetic disk drive, the heater 42 and the vicinity thereof are heat-deformed to control the flying height (spacing from the magnetic disk) of the magnetic transducer 17.

Figure 6:
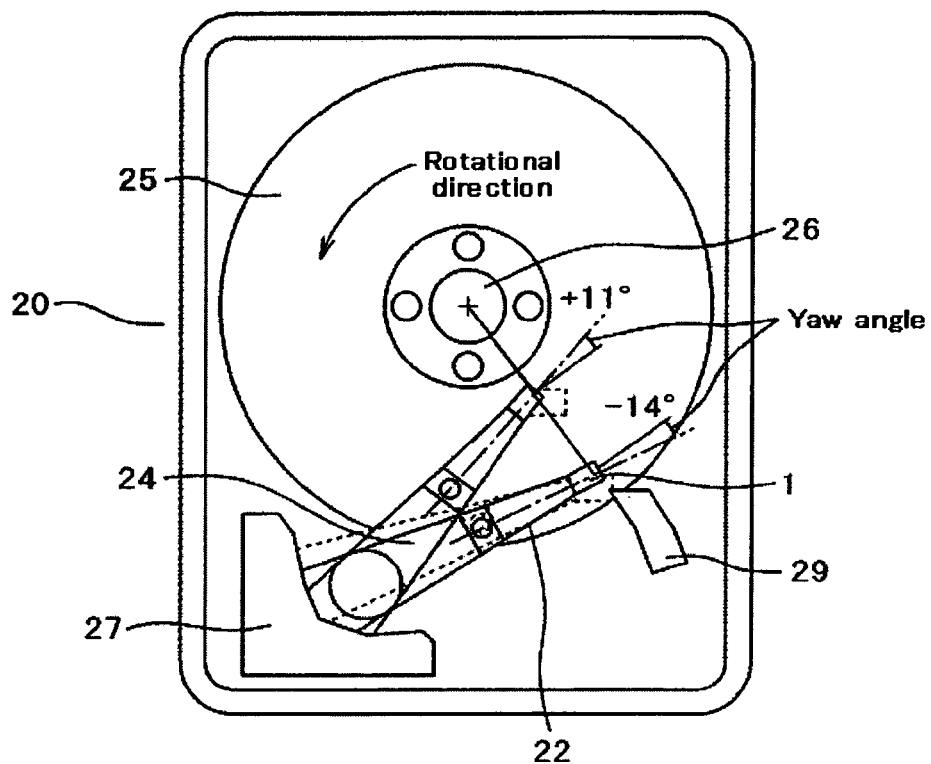
FIG. 6 is a plan view of a magnetic disk drive carrying thereon the magnetic head slider according to the present invention.

FIG. 6 is a plan view of a magnetic disk drive 20 which carries thereon the magnetic head slider according to the present invention. The magnetic disk drive 20 carries thereon a disk recording medium (magnetic disk) 25 of 48 mm in diameter with a yaw angle change of about +11° to about −14°. The yaw angle is an angle between a direction in which air flows into the slider 1 along the circumference of the magnetic disk 25 with a pivoting motion of a rotary actuator 27 and the longitudinal direction of the slider 1. Here, the slider 1 is positioned in opposition to the magnetic disk 25. As to the reference mark of the yaw angle, the direction in which air flows in from the inner periphery side of the magnetic disk 25 relative to the longitudinal direction of the slider 1 is represented as being positive. A ramp 29 is provided for loading or unloading the slider 1 to or from over the magnetic disk 25. The magnetic disk 25 is mounted to a spindle 26 adapted to rotate at 4200 rpm. A head support mechanism is made up of the rotary actuator 27, carriage 24, suspension 22, and slider 1 attached to a front end of the suspension 22. With a force of 2.0 gf, the slider 1 is pushed against the magnetic disk 25 by the suspension 20 and flies above the magnetic disk 25 because an air flow created with rotation of the magnetic disk 25 gets in between the slider 1 and the magnetic disk 25. With the rotary actuator 27, the slider 1 is positioned at an arbitrary radial position ranged approximately from 11 to 21 mm over the magnetic disk 25 and performs write and read of information to and from the magnetic disk through the magnetic transducer 17 which is mounted on the trailing pad surface 16 on the rear pad 12 of the slider 1. Although the magnetic disk drive referred to above is a 1.8 inch type disk drive as an example, no limitation is made thereto. The magnetic disk drive may be one having a larger or smaller diameter.

Figure 7:
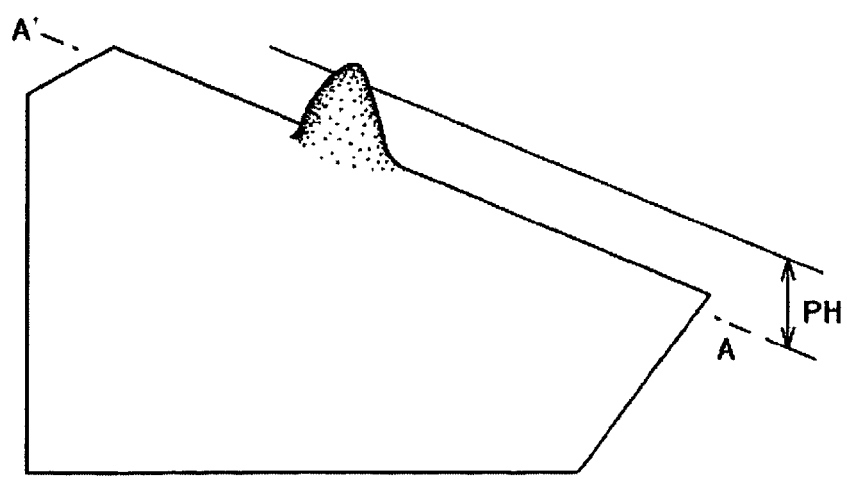
FIG. 7 is a perspective view showing the shape of a projecting deformation from an air bearing surface upon operation of a flying height control mechanism.

Next, a description will be given about a mechanism able to diminish the flying height control power for the slider 1 which has the heater 42 referred to above. A heat deformation is allowed to occur by local heating with the use of the heater 42 disposed adjacent the magnetic transducer 17, causing the air bearing surface 3 located near the magnetic transducer 17 to be projected and deformed to the outside of the surface. FIG. 7 is a perspective view of a projected shape of the air bearing surface 3 as viewed from the leading edge 2 side so as to include the A-A' line in FIG. 3. In order to facilitate understanding of the projected shape, FIG. 7 is drawn exclusive of the rail shape of the air bearing surface 3. In the same figure is also shown a maximum projection height PH at the position of the magnetic transducer 17 with respect to the surface before the projecting deformation. Since the projecting deformation utilizes heat deformation, it is the most heated position that the maximum projection height PH is reached. The deformed shape is gently skirted from that position as a peak. Although the projected shape shown in FIG. 7 is not strictly coincident with an actual deformation shape, it is considered sufficient as a primary approximate shape for explaining the influence of the projecting deformation on a change in flying height.

Figure 8:
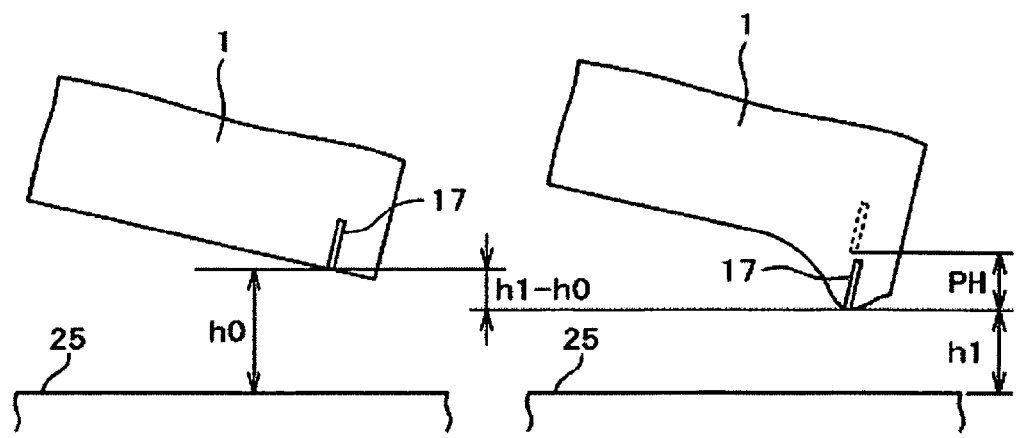
FIG. 8 is a diagram explaining a change of flying height by a flying height control mechanism.

FIG. 8 shows a relation between actual flying heights $h0$, $h1$ and the maximum projection height PH. As shown in the left portion of FIG. 8, the gap between the position of the magnetic transducer 17 in an OFF condition of the heater 42 and the magnetic disk 25, i.e., the flying height, is assumed to be $h0$. On the other hand, as shown in the right portion of FIG. 8, the flying height in an ON condition of the heater 42, involving the maximum projection height PH, is assumed to be $h1$. In this case, $\Delta h$ represented by $\Delta h = h1 - h0$ indicates a flying height change quantity which occurs upon operation of the heater 42. In the most ideal state, the flying height change quantity $\Delta h$ is equal to the maximum projection height PH and the heater 42 operates with a minimum power consumption. Actually, however, since a deformation of the magnetic transducer 17 to the outside of the air bearing surface 3 in the vicinity of the same surface causes a change of the flying force developed near the magnetic transducer 17, the maximum projection height PH does not directly become the flying height change quantity $\Delta h$ but some percentage of the maximum projection height PH appears as the flying height change quantity $\Delta h$. $(PH - \Delta h)/PH \times 100$ is represented as the flying height compensation ratio. Thus, the slider having the flying height control mechanism and a high flying height control efficiency, i.e., the slider of a small control power, indicates a slider of a small flying height compensation ratio. That is, it can be said that the slider having a flying height control mechanism of a small power consumption is a slider of a small change in flying height caused by projection.

Figure 9:
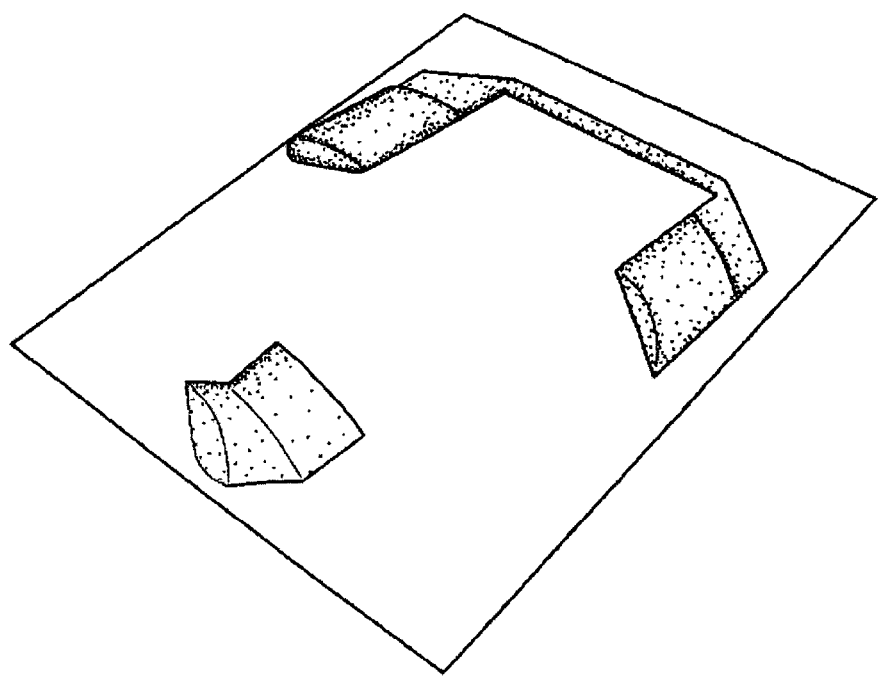
FIG. 9 is a perspective view showing a pressure distribution in a magnetic head slider according to the prior art.

A description will now be given about the flying height compensation ratio of a slider having a flying height control mechanism according to the prior art. In the slider according to the prior art, a distribution of a pressure which generates a flying force between the flying slider and a magnetic disk in the vicinity of a magnetic transducer is as shown in FIG. 9. FIG. 9 is a perspective view of the slider as seen from a trailing edge side, showing a pressure distribution generated on an air bearing surface of the slider. In the same figure, an upward height with respect to the quadrangular air bearing surface indicates the magnitude of pressure, and the position corresponding to the highest pressure is distributed on this side of the same figure. This position corresponds to the position where the magnetic transducer is present. The reason why such a pressure distribution is produced is that the conventional slider is designed so as to set the magnetic transducer to the lowest position in flying height for improving the read/write efficiency from or to a magnetic disk. At the position lowest in flying height, i.e., at the position of the smallest gap for flying, there occurs the highest pressure on the rail surface.

Figure 10:
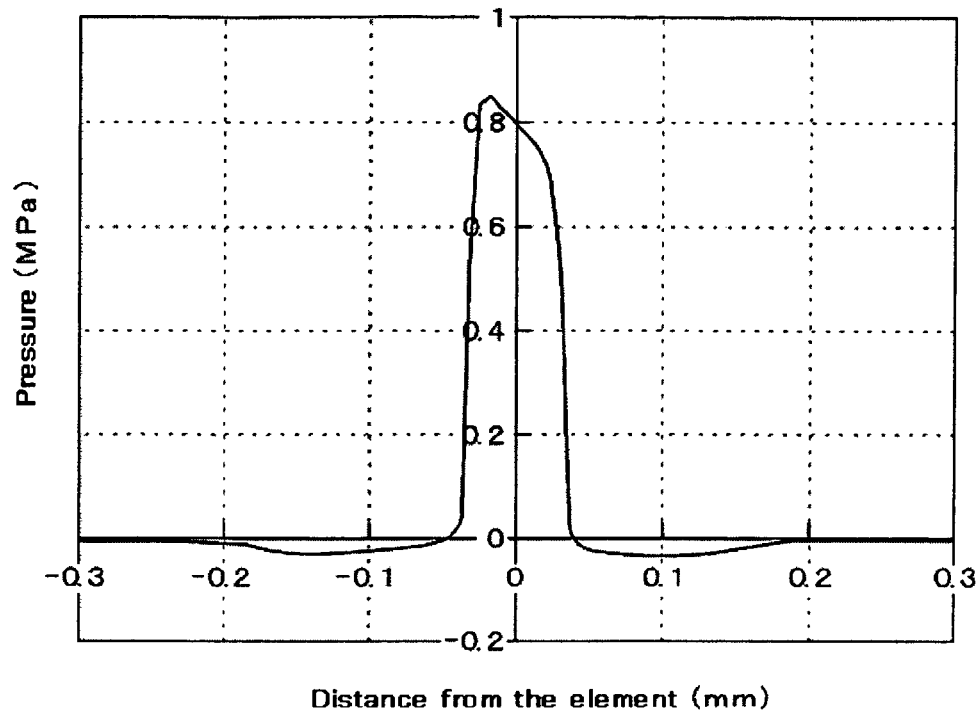
FIG. 10 is a diagram showing a pressure distribution in the slider width direction crossing over a magnetic transducer in the magnetic head slider according to the prior art.

Next, to facilitate understanding of this pressure distribution, FIG. 10 shows a pressure distribution in a crossing direction along the slider width on the magnetic transducer which is present at a distance of 1.21 mm in the slider longitudinal direction with respect to the leading edge of the slider. In the same figure, a pressure distribution in the range of ±0.3 mm is shown with respect to a central position of the magnetic transducer when the slider is seen in its transverse direction. As is seen from the same figure, there is one pressure peak, which is positioned substantially near the center of the magnetic transducer. Strictly speaking, the peak is offset to a negative position side, but this is because the pressure distribution was determined when the slider in the magnetic disk drive lay near an inner periphery position and a yaw angle of about 11° from the leading edge side is involved in the slider. The conventional slider is designed so as to exhibit such a pressure distribution as shown in FIGS. 9 and 10. This is because the shape according to such a design is adopted for diminishing variations in flying height at a minimum flying height position attributable to the shape and groove of the slider and the manufacturing process including an urging load and for improving the follow-up characteristic of the slider for the magnetic disk. However, if such a conventional technique is applied to the slider having the flying height control mechanism, since the pressure developed near the magnetic transducer is high, a change of the flying force with a projecting deformation is large and a sufficient flying height change quantity Δh is not obtained unless the projecting deformation is made larger. That is, there occurs an increase of power consumption for controlling the flying height.

Figure 11:
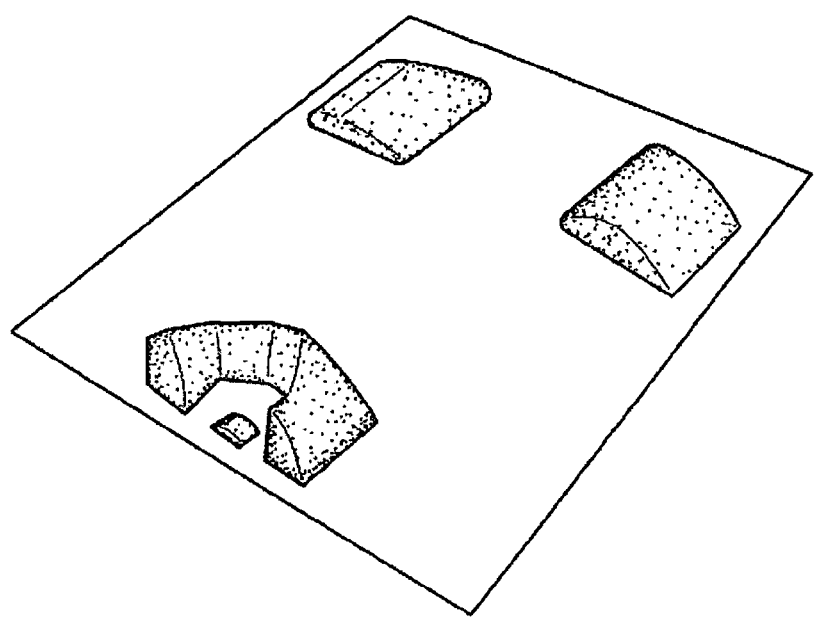
FIG. 11 is a perspective view showing a pressure distribution in the magnetic head slider of the first embodiment.
Figure 12:
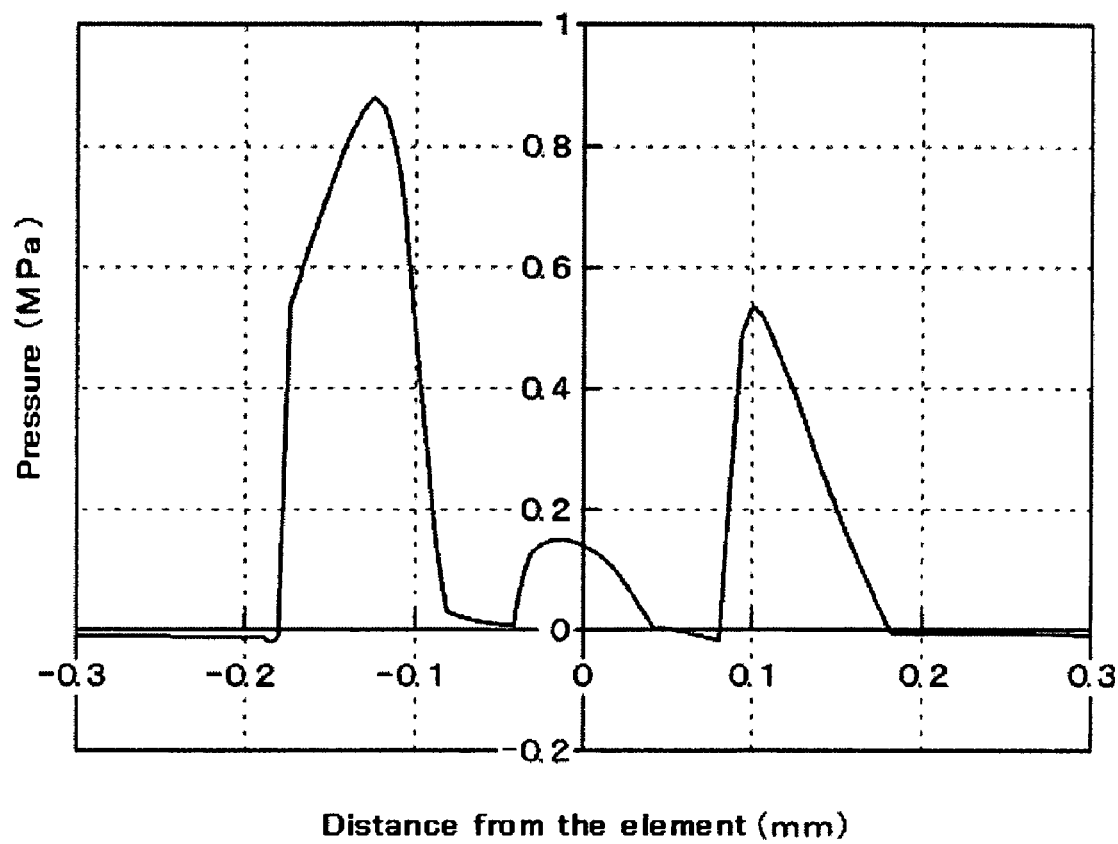
FIG. 12 is a diagram showing a pressure distribution in the slider width direction crossing over the magnetic transducer in the magnetic head slider of the first embodiment.

In the slider 1 according to this first embodiment, the pressure distribution developed near the magnetic transducer 17 is noticed and the shape of the air bearing surface is designed so that the pressure change caused by the projecting deformation can be made small. A pressure distribution of the slider of this first embodiment is shown in FIG. 11. FIG. 11 is a perspective view as seen from the same angle as in FIG. 9. In this pressure distribution, as shown in FIG. 11, the pressure near the magnetic transducer 17 is low and a high pressure distribution is developed on the trailing rail surface portions 14 positioned on both sides of the magnetic transducer 17. FIG. 12 shows a pressure distribution at the same position as in FIG. 10. It is seen that there is a distinct difference between the pressure distribution in the slider 1 of this first embodiment and that in the conventional slider described above. That is, the pressure distribution in the slider 1 of this first embodiment is divided into three peaks corresponding to the trailing rail surface portions 14 positioned on both sides of the magnetic transducer and the trailing pad surface 16. Further, pressure peaks are developed on the rail surface portions 14 on both sides not including the magnetic transducer 17.

By applying the shape of the air bearing surface in the first embodiment described above to the slider having the flying height control mechanism, it is possible to diminish the occurrence of pressure near the magnetic transducer 17 and decrease the change of the flying force caused by the projecting deformation, so that the ratio of the projection height PH appearing as a change of flying height increases and the flying height compensation ratio is lowered. That is, the flying height can be changed with a reduced control power. According to this first embodiment, moreover, since the pressure is divided to both sides of the magnetic transducer 17 and the highest pressure is developed at that position, there also accrues an advantage such that a flying height variations decreasing effect and the follow-up characteristic of the slider for the magnetic disk, which are equal to those in the conventional slider, are ensured. Thus, the slider 1 of this first embodiment is characterized in that the pressure concentrated near the magnetic transducer 17 is made low on the pad surface including the magnetic transducer 17 and a maximum pressure is developed on the rail surface portions positioned on both sides thereof.

Figure 13A:
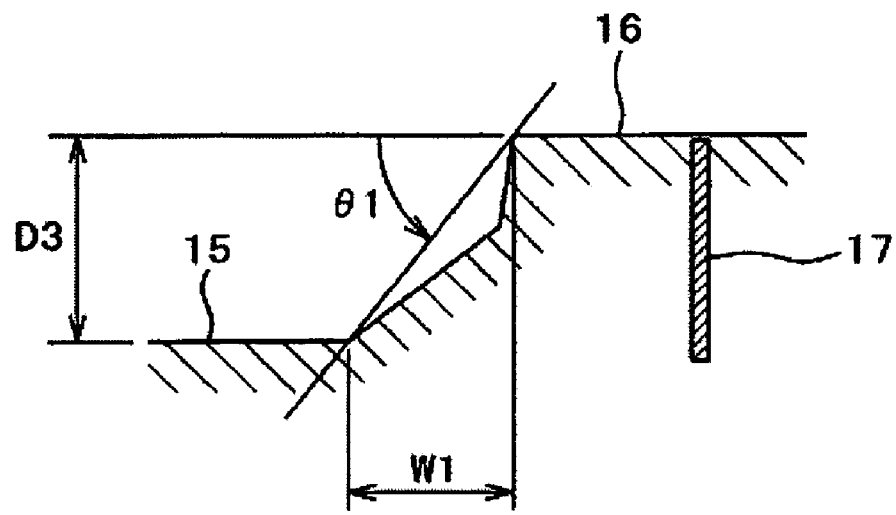
FIG. 13A is a sectional view of a slant surface type 1 taken along line B-B' in FIG. 3.
Figure 13B:
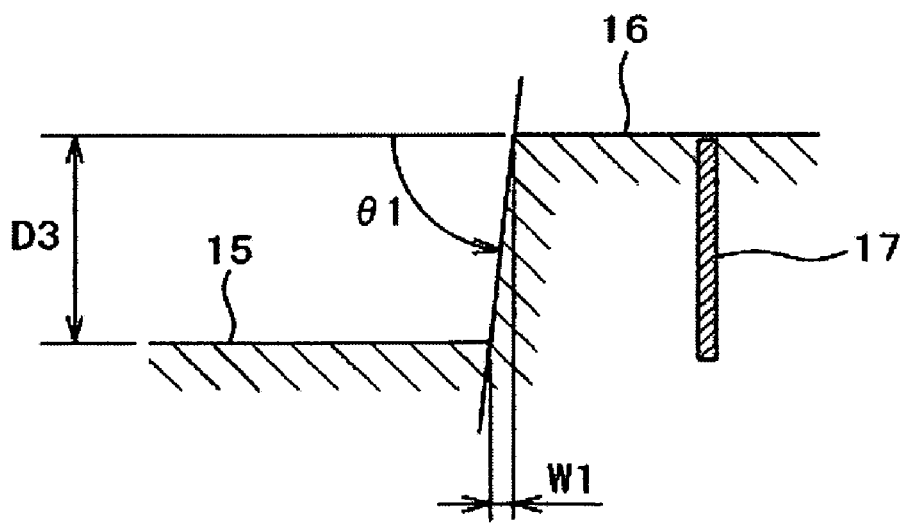
FIG. 13B is a sectional view of a slant surface type 2 taken along line B-B' in FIG. 3.

A description will now be given about a technique for generating such a pressure distribution in a more efficient manner. It is concerned with the shape of the slant surface formed between the trailing pad surface 16 including the magnetic transducer 17 and the bottom surface of the intermediate groove 15 formed around and deeper than the trailing rail surface 16. FIGS. 13A and 13B illustrate the feature of the slant surface able to exhibit the effect of the present invention more efficiently. FIGS. 13A and 13B are sectional views taken along line B-B' in FIG. 3, showing a groove surface formed by subjecting the intermediate groove 15 to etching, e.g., ion milling. The slant surface thus formed is of such a shape as shown in FIG. 13A (slant surface type 1) in the case of ion milling or such a shape as shown in FIG. 13B (slant surface type 2) in the case of reactive ion etching (RIE). What is important is an inclination angle θ1 which is defined from the trailing pad surface 16 toward the bottom surface of the intermediate groove 15. The inclination angle θ1 represents an angle at a position of a horizontal distance W1 reaching the depth D3 from the edge of the trailing pad surface 16. The shapes of slant surfaces until reaching W1 are different like FIGS. 13A and 13B, but in the present invention they are defined as in the drawings respectively.

For generating such a pressure distribution as in the slider 1 of this first embodiment, it is preferable that the angle θ1 be about 0.002° or larger. If it is smaller than about 0.002°, the pressure developed on the trailing pad surface 16 including the magnetic transducer 17 increases and the flying force caused by a projecting deformation is developed up to a level equal to that in the conventional slider, so that the flying height compensation ratio is made high and it becomes impossible to attain a satisfactory reduction of the control power. For dispersing the pressure concentrated on one peak in the conventional slider into three peaks by forming the intermediate groove 15, it is necessary for the intermediate groove 15 to have a certain degree of depth and inclination angle.

Figure 14:
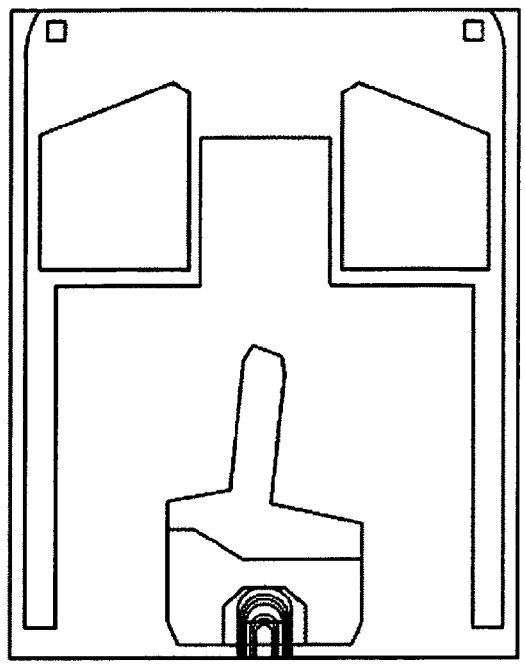
FIG. 14 is a diagram showing an analytical model of the magnetic head slider of the first embodiment.
Figure 15:
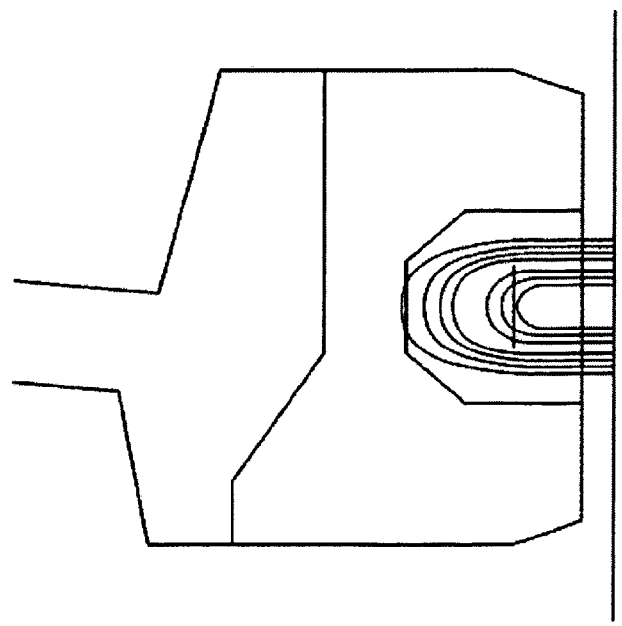
FIG. 15 is an enlarged diagram of the magnetic transducer and the vicinity thereof shown in FIG. 14.
Figure 16:
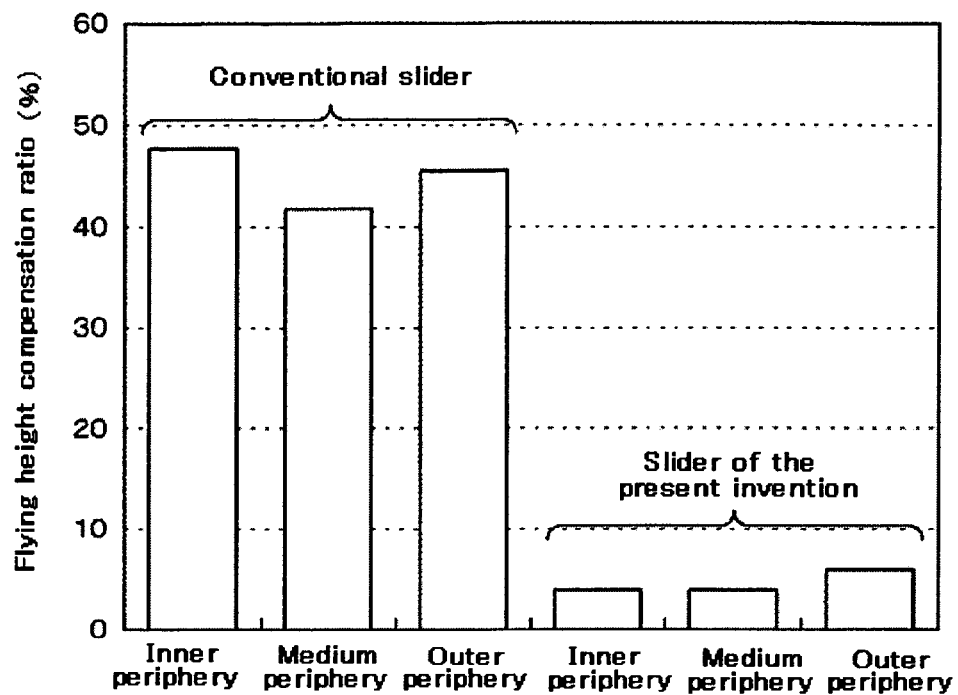
FIG. 16 is a diagram comparing flying height compensation ratios obtained by analysis.

FIG. 14 shows analytical results on the effect of the slider 1 according to the first embodiment. FIG. 14 represents the air bearing surface 3 used in the analysis. The analytical model illustrated therein makes a model of the first embodiment. In the same figure, a projecting shape distribution in the vicinity of the magnetic transducer 17 obtained upon operation of the flying height control mechanism is shown in terms of contour lines. In FIG. 15, the rear pad 15 is shown on a larger scale so that the contour lines of the projecting shape can be seen. An estimated maximum projection height PH by the flying height control mechanism is 5 nm and a three-dimensional shape thereof is almost the same as that in FIG. 7. FIG. 16 shows a comparison between the flying height compensation ratio obtained upon operation of the flying height control mechanism in the slider 1 according to the present invention and that in the conventional slider both used under the same magnetic disk drive condition. In the same figure there are shown results obtained when the sliders lie in inner periphery, medium periphery and outer periphery positions within the magnetic disk drive. As is seen from the same figure, in the conventional slider, even at a flying height compensation ratio near 50%, i.e., even if a projecting deformation of 5 nm is made by the flying height control mechanism, it is offset to a flying height change of 2.5 nm which is about half. On the other hand, in the slider 1 according to the present invention, the flying height compensation ratio becomes about 5%, that is, when a projecting deformation of 5 nm is made by the flying height control mechanism, a flying height of only about 0.3 nm is offset and it is possible to obtain a lowering of flying height of 4.7 nm. Thus, there is an approximately ten-fold difference in the flying height compensation ratio between the conventional slider and the slider 1 according to the present invention, and also from the analytical results it is apparent that the slider 1 according to the present invention is suitable for the magnetic head slider having the flying height control mechanism.

The effectiveness of the present application for the slider 1 having the flying height control mechanism has been described above by way of the first embodiment. As described above, the present invention is characterized in that the pressure concentrated near the magnetic transducer 17 is made low on the pad surface including the magnetic transducer 17 and a maximum pressure is developed on the rail surface portions positioned on both sides of the magnetic transducer. A characteristic shape of the air bearing surface for creating such an effect will be described below as another embodiment. In the following shape of the air bearing surface it is important that the pressure distribution near the magnetic transducer 17 have the same feature as that in the first embodiment. A two-dimensional rail shape of the air bearing surface and the groove depth can be set arbitrarily in the form of satisfying other flying characteristics.

Figure 17:
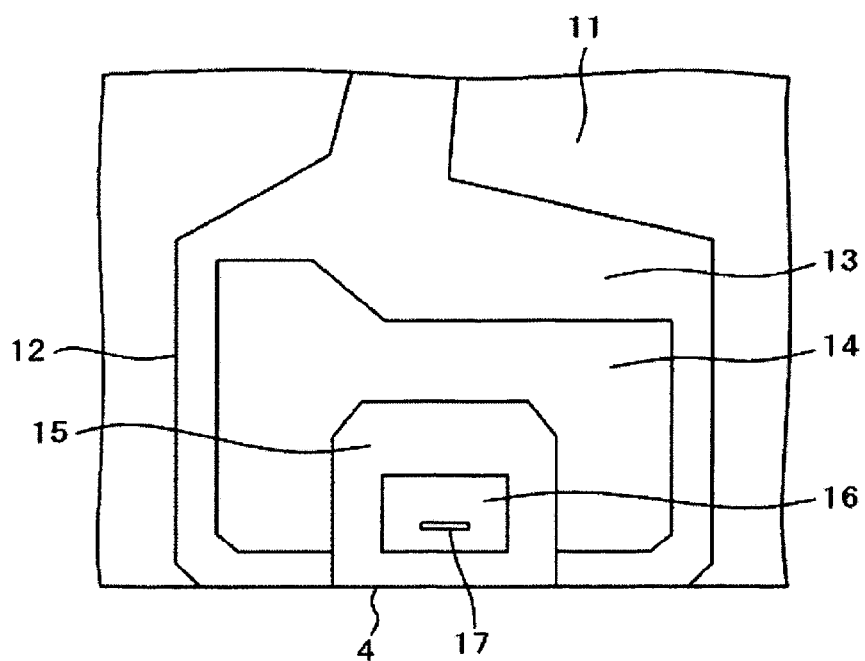
FIG. 17 is a plan view of a magnetic transducer and the vicinity thereof in a magnetic head slider according to a second embodiment of the present invention.

FIG. 17 is a plan view of a rear pad 12 and the vicinity thereof in a slider according to a second embodiment of the present invention. The slider 1 of this second embodiment has the rear pad 12 which is the same as in the first embodiment, but is characterized in that a trailing-side step bearing surface 13 is formed so as to surround a trailing rail surface 14, an intermediate groove 15 and a trailing pad surface 16, and reaches the trailing edge 4. The intermediate groove 15 may also extend up to the trailing edge 4 and an intermediate groove depth D3 can also be set arbitrarily in accordance with a design target. Also according to such an arrangement, the same pressure distribution as in the first embodiment is produced and therefore it is possible to attain the effect of diminishing the control power for the slider 1 having the flying height control mechanism. Moreover, since the trailing-side step bearing surface 13 is formed so as to surround the trailing rail surface 14, intermediate groove 15 and trailing pad surface 16, even if a lubricant applied to the surface of the magnetic disk adheres temporarily to the trailing rail surface 14, intermediate groove 15 and trailing pad surface 16, it is blown off by an air flow passing the trailing-side step bearing surface 13, and thus there also is obtained an effect that it is difficult for the lubricant to stay in those portions.

Figure 18:
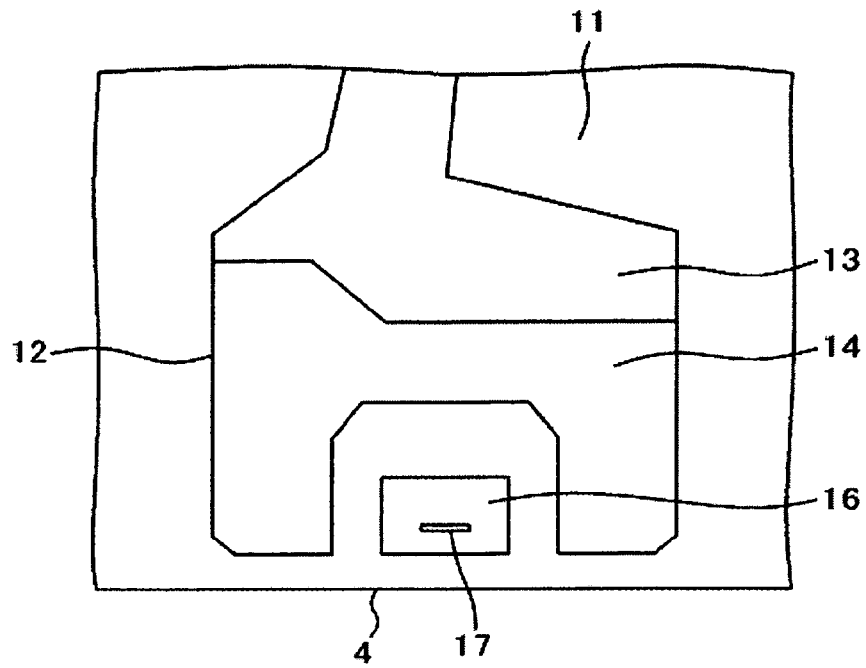
FIG. 18 is a plan view of a magnetic transducer and the vicinity thereof in a magnetic head slider according to a third embodiment of the present invention.

FIG. 18 is a plan view of a rear pad 12 and the vicinity thereof in a slider according to a third embodiment of the present invention. The slider 1 of this third embodiment has the rear pad 12 which is the same as in the first embodiment, but is characterized in that the region where the intermediate groove 15 in the first embodiment is formed is formed at the same groove depth D2 as that of the deep groove surface 11 and by the same process as that of forming the deep groove surface 11. As a result, it becomes unnecessary to form the intermediate groove 15 and hence possible to shorten the manufacturing process. Thus, the shape in question is superior in point of cost. Also according to this third embodiment, the same pressure distribution as in the first embodiment is produced and therefore it is possible to exhibit the effect of diminishing the control power for the slider 1 having the flying height control mechanism.

Figure 19:
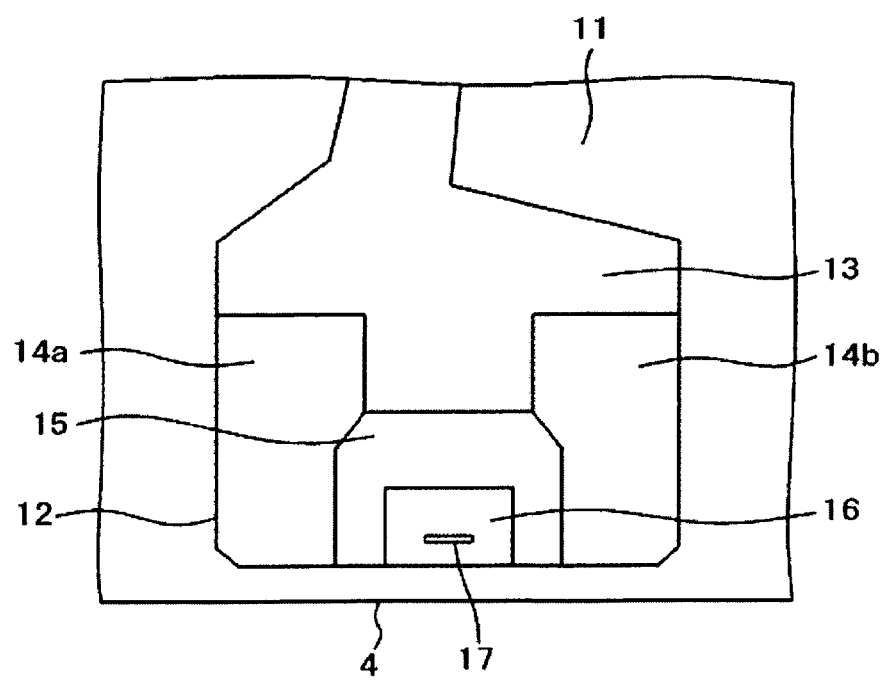
FIG. 19 is a plan view of a magnetic transducer and the vicinity thereof in a magnetic head slider according to a fourth embodiment of the present invention.

FIG. 19 is a plan view of a rear pad 12 and the vicinity thereof in a slider according to a fourth embodiment of the present invention. The slider 1 of this fourth embodiment has the same rear pad 12 as in the first embodiment, but is characterized in that the trailing rail surface 14 in the first embodiment is divided in the vicinity of the leading side of the trailing pad surface 16 into a left trailing rail surface 14a and a right trailing rail surface 14b by an trailing-side step bearing surface 13. According to this arrangement, a relatively high pressure portion of the trailing rail surface 14 positioned on the leading side of the trailing pad surface 16 as in the first embodiment is no longer present, but a high pressure is developed on both left and right trailing rail surfaces 14a and 14b, so that the same pressure distribution as in the first embodiment is produced also in this fourth embodiment. Consequently, it is possible to obtain the effect of decreasing the control power for the slider having the flying height control mechanism. Moreover, since the trailing rail surface is divided into right and left surfaces, even if the lubricant applied to the magnetic disk surface adheres temporarily to the left and right trailing rail surfaces 14a, 14b, intermediate groove 15 and trailing pad surface 16, it is blown off by an air flow passing between both trailing rail surfaces 14a and 14b. Thus, there also is obtained an effect that it is difficult for the lubricant to stay in those portions.

Figure 20:
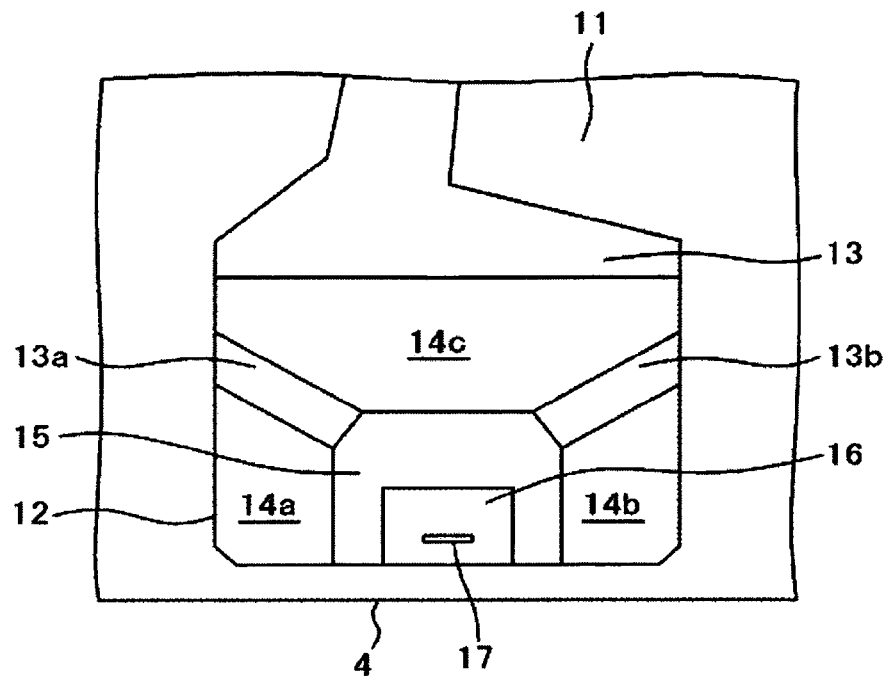
FIG. 20 is a plan view of a magnetic transducer and the vicinity thereof in a magnetic head slider according to a fifth embodiment of the present invention.

FIG. 20 is a plan view of a rear pad 12 and the vicinity thereof in a slider according to a fifth embodiment of the present invention. The slider 1 of this fifth embodiment has the same rear pad 12 as in the first embodiment, but is characterized in that the trailing rail surface 14 in the first embodiment is divided in the vicinity of the leading side of the trailing pad surface 16 into a front trailing rail surface 14c, a left trailing rail surface 14a and a right trailing rail surface 14b by a trailing-side step bearing surface 13. Step bearing surfaces 13a and 13b which separate the trailing rail surface 14 in the first embodiment are formed for preventing stagnation of the air flow in the intermediate groove 15. The depth thereof may be set arbitrarily. Also in this arrangement, the same pressure distribution as in the first embodiment is developed and hence it is possible to obtain the effect of diminishing the control power for the slider having the flying height control mechanism. Further, as in the fourth embodiment there is obtained an effect that it is difficult for the lubricant to adhere to the air bearing surface.

Figure 21:
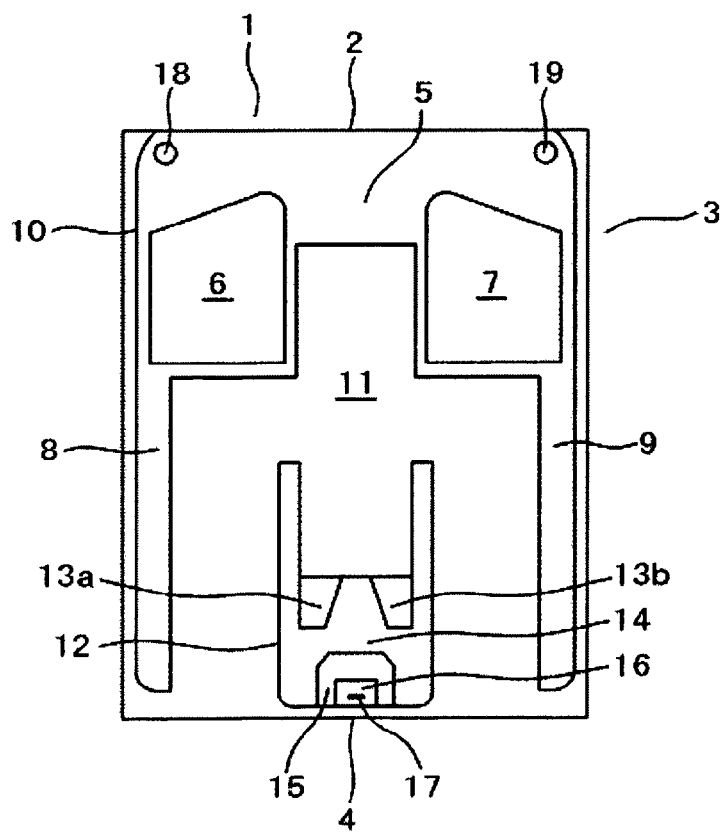
FIG. 21 is a plan view showing a magnetic head slider according to a sixth embodiment of the present invention.
Figure 22:
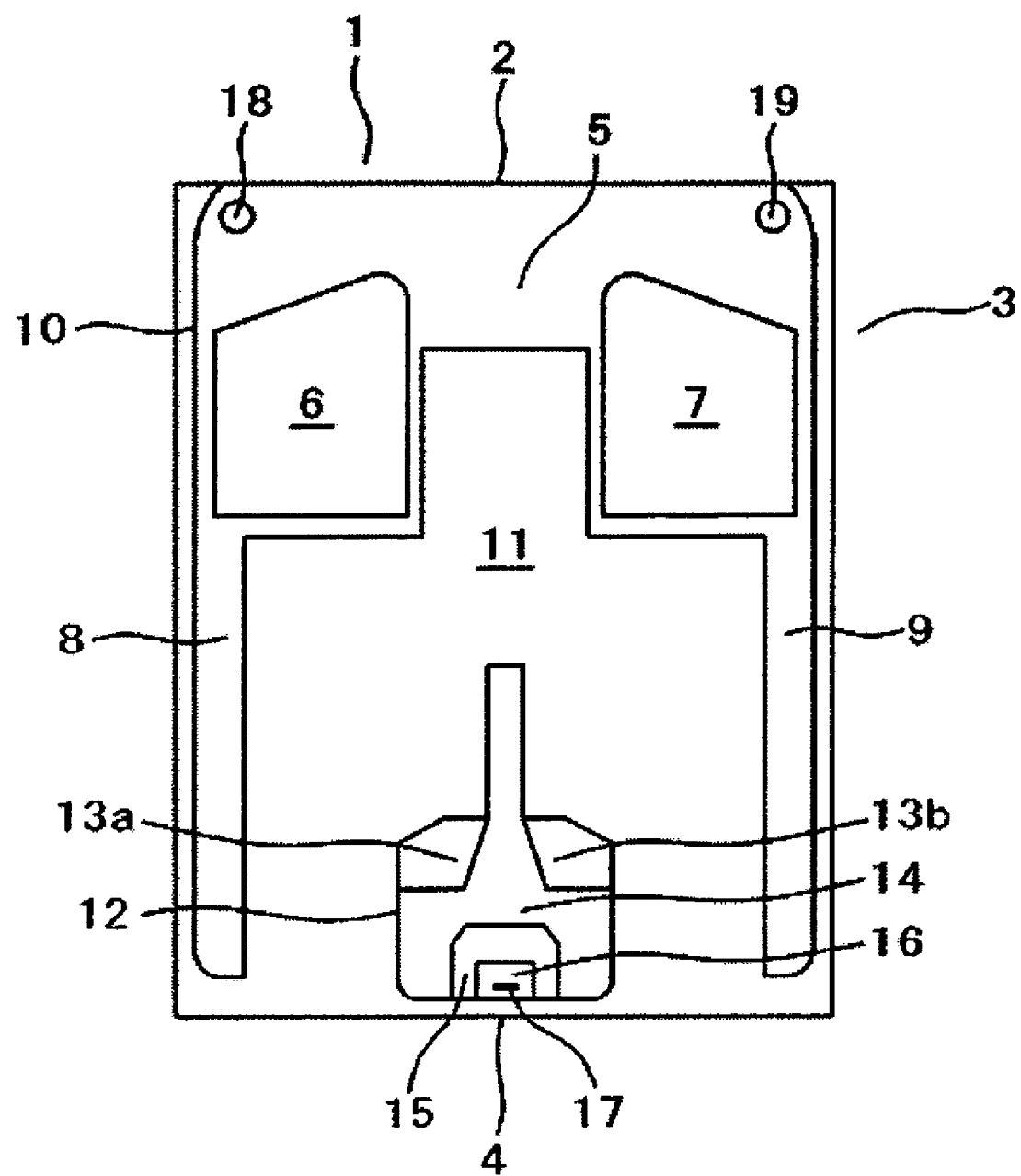
FIG. 22 is a plan view of a magnetic head slider according to a seventh embodiment of the present invention.

FIGS. 21 and 22 are plan views of sliders according to sixth and seventh embodiments of the present invention. The sliders 1 of the sixth and seventh embodiments are characterized by leading-side shapes of trailing-side step bearing surfaces 13a, 13b and a trailing rail surface 14 which constitute a rear pad 12. According to the construction of the sixth embodiment it is possible to form portions of a higher pressure than in the first embodiment on both sides of the trailing pad surface 16 including the magnetic transducer 17. In the slider 1 of the seventh embodiment, a portion of a higher pressure than in the first embodiment can be formed around the trailing pad surface 16 including the magnetic transducer 17.

Figure 23:
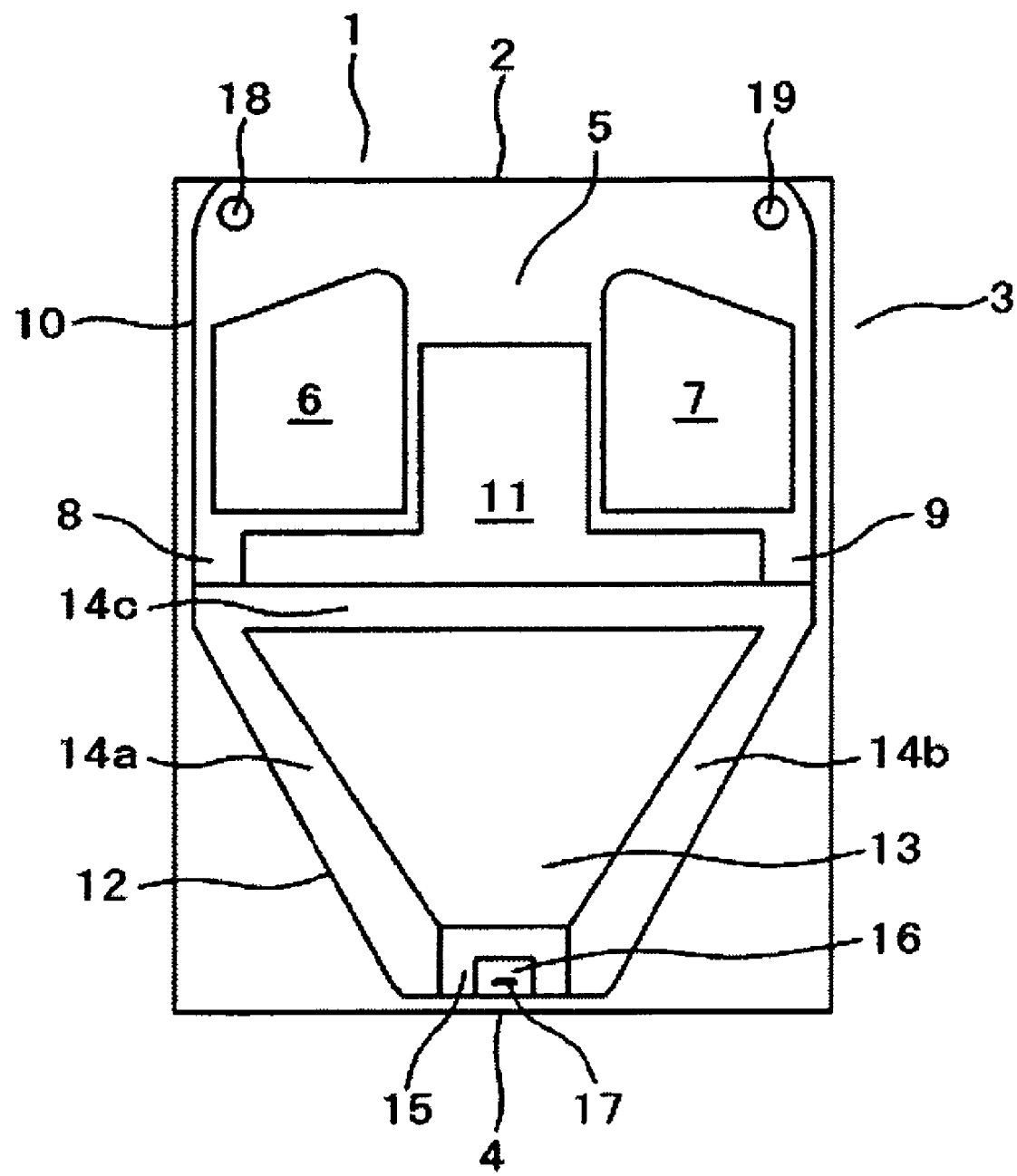
FIG. 23 is a plan view of a magnetic head slider according to an eighth embodiment of the present invention.

FIG. 23 is a plan view of a slider according to an eighth embodiment of the present invention. In the slider 1 of this eighth embodiment, trailing side rail surfaces 14a and 14b have a rail shape extending largely to the vicinity of the magnetic transducer 17 from near the central part of the slider. Also in such a rail shape the pressure distribution near the magnetic transducer 17 corresponds to the pressure distribution contemplated in the present invention. Moreover, according to this construction, the rigidity of the slider 1 against rolling in its rolling direction becomes higher.

Figure 24:
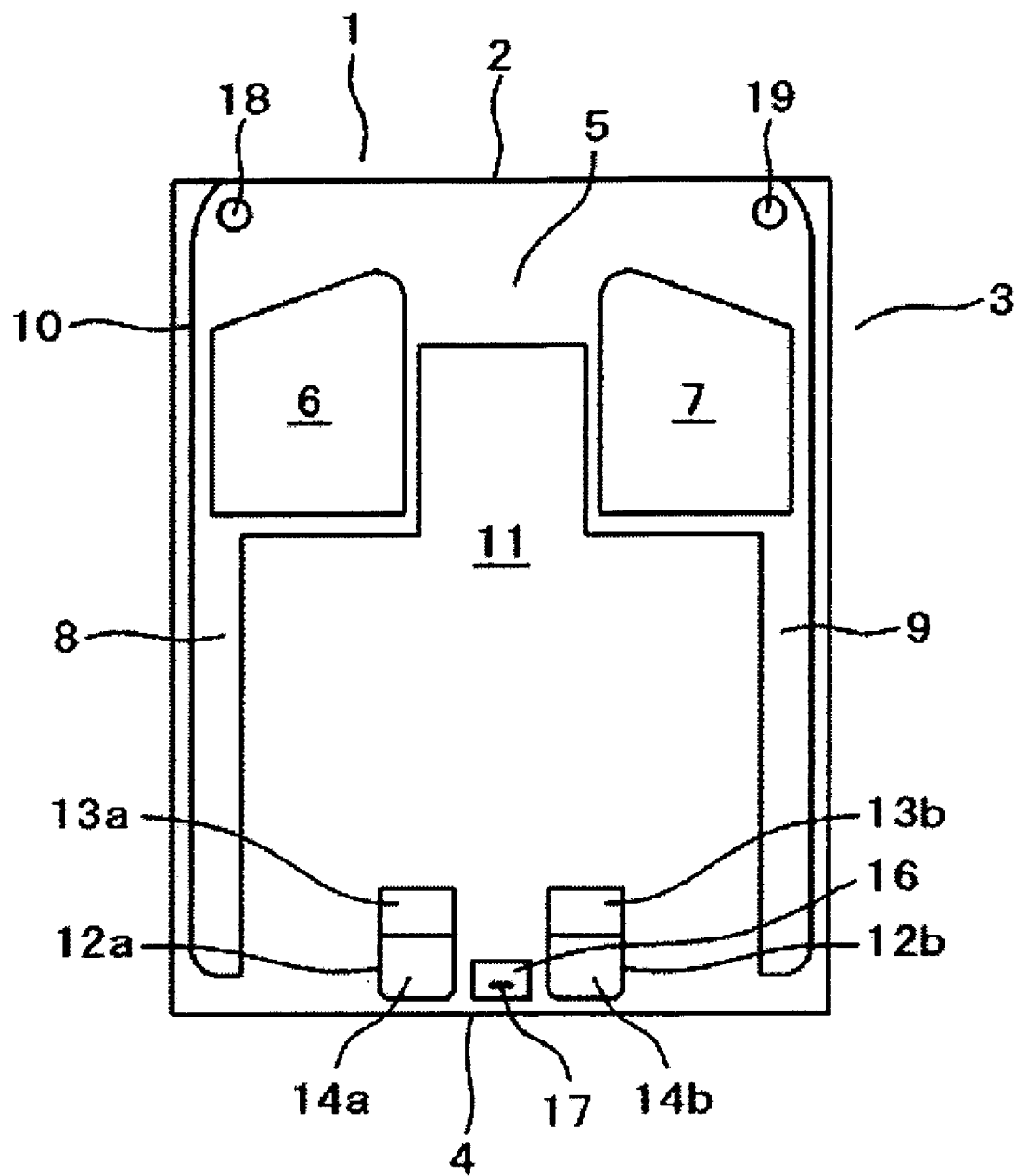
FIG. 24 is a plan view of a magnetic head slider according to a ninth embodiment of the present invention.

FIG. 24 is a plan view of a slider according to a ninth embodiment of the present invention. The slider 1 of this ninth embodiment is provided with a trailing pad surface 16 including a magnetic transducer 17, a trailing side rail 12a formed by both a step bearing surface 13a and a trailing side rail surface 14a, and a trailing side rail 12b formed by both a step bearing surface 13b and a trailing side rail surface 14b, the trailing side rail 12b being located on the side opposite to the trailing side rail 12a in the slider width direction. These rails are separated through a deep groove surface 11, whereby the pressure distribution near the magnetic transducer 17 is separated. Moreover, since the trailing pad 16 does not have a step bearing surface, the pressure of both side rails not having a step bearing surface becomes high, so that the pressure distribution contemplated in the present invention is obtained. Further, since the trailing pad surface 16 and the trailing side rails 12a, 12b are separated by the deep groove surface 11, it is possible to omit a process of forming an intermediate groove.

The shape and rail construction of the leading rail surfaces 6 and 7 in the above first to ninth embodiments are not specially limited.

As set forth above, according to the magnetic head slider of each of the first to ninth embodiments, the pressure distribution in the vicinity of the magnetic transducer is made low on the pad surface including the magnetic transducer and a maximum pressure is developed on the rail surfaces positioned on both sides of the pad surface, whereby it is possible to diminish the flying height compensation ratio in the slider having the flying height control mechanism. Further, according to the magnetic disk drive carrying the magnetic head slider of any of the first to ninth embodiments, it is possible to decrease the power consumption for controlling the flying height of the magnetic transducer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head slider comprising a leading edge, an air bearing surface, and a trailing edge, said air bearing surface comprising a leading rail surface formed on a leading edge side, a leading-side step bearing surface formed between said leading edge and said leading rail surface, a trailing pad surface formed on said trailing edge side and having a magnetic transducer integral with a flying height control mechanism, a trailing rail surface formed on both sides of said trailing pad surface along said trailing edge, a trailing-side step bearing surface formed on said leading edge side of said trailing rail surface, and a deep groove surface formed between said leading rail surface and said trailing rail surface, said deep groove surface being deeper than each of said step bearing surfaces, and each of said step bearing surfaces being deeper than each of said rail surfaces and said pad surface,
wherein said trailing rail surface is formed on both sides of said magnetic transducer in a crossing direction along the slider width and parallel to said trailing edge, such that an imaginary line connecting said trailing rail surface on both sides would cross said magnetic transducer.

2. The magnetic head slider according to claim 1, wherein, in a flying state of the magnetic head slider over a magnetic disk, a pressure developed on said trailing rail surface is higher than a pressure developed on said trailing pad surface.

3. The magnetic head slider according to claim 1, wherein said flying height control mechanism is a heater.

4. The magnetic head slider according to claim 1, wherein said trailing pad surface and said trailing rail surface are separated from each other by said deep groove surface.

5. The magnetic head slider according to claim 4, wherein an angle of inclination of a wall surface extending from an end of said trailing pad surface up to said deep groove surface on said trailing rail surface side is equal to or larger than about 0.002°.

6. The magnetic head slider according to claim 1, wherein said trailing-side step bearing surface is formed on the leading side of said trailing rail surface and said trailing pad surface, and said trailing pad surface is separated from said trailing rail surface and said trailing-side step bearing surface through a groove.

7. A magnetic head slider comprising a leading edge, an air bearing surface, and a trailing edge, said air bearing surface comprising a leading rail surface formed on a leading edge side, a leading-side step bearing surface formed between said leading edge and said leading rail surface, a trailing pad surface formed on said trailing edge side and having a magnetic transducer integral with a flying height control mechanism, a trailing rail surface formed on both sides of said trailing pad surface along said trailing edge, a trailing-side step bearing surface formed on said leading edge side of said trailing rail surface, and a deep groove surface formed between said leading rail surface and said trailing rail surface, said deep groove surface being deeper than each of said step bearing surfaces, and each of said step bearing surfaces being deeper than each of said rail surfaces and said pad surface,
wherein said trailing-side step bearing surface is formed on the leading side of said trailing rail surface and said trailing pad surface, and said trailing pad surface is separated from said trailing rail surface and said trailing-side step bearing surface through a groove, and
wherein the angle of inclination of a wall surface extending from an end of said trailing pad surface up to a bottom surface of said groove on said trailing rail surface side is equal to or larger than about 0.002°.

8. The magnetic head slider according to claim 7, wherein, in a flying state of the magnetic head slider over a magnetic disk, a pressure developed on said trailing rail surface is higher than a pressure developed on said trailing pad surface.

9. The magnetic head slider according to claim 7, wherein said flying height control mechanism is a heater.

10. The magnetic head slider according to claim 7, wherein said trailing pad surface and said trailing rail surface are separated from each other by said deep groove surface.

11. The magnetic head slider according to claim 10, wherein an angle of inclination of a wall surface extending from an end of said trailing pad surface up to said deep groove surface on said trailing rail surface side is equal to or larger than about 0.002°.

12. A magnetic head slider comprising a leading edge, an air bearing surface, and a trailing edge, said air bearing surface comprising a leading rail surface formed on a leading edge side, a leading-side step bearing surface formed between said leading edge and said leading rail surface, a trailing pad surface formed on said trailing edge side and having a magnetic transducer which incorporates a flying height control mechanism, a trailing rail surface formed on the leading edge side and both sides of said trailing pad surface, a trailing-side step bearing surface formed on the leading edge side of said trailing rail surface, and a deep groove surface formed between said leading rail surface and said trailing rail surface,
  wherein said trailing rail surface is formed on both sides of said magnetic transducer in a crossing direction along the slider width and parallel to said trailing edge, such that an imaginary line connecting said trailing rail surface on both sides would cross said magnetic transducer.

13. The magnetic head slider according to claim 12,
  wherein, in a flying state of the magnetic head slider over a magnetic disk, a pressure developed on said trailing rail surface is higher than a pressure developed on said trailing pad surface.

14. The magnetic head slider according to claim 12, wherein said flying height control mechanism is a heater.

15. The magnetic head slider according to claim 12, wherein said trailing pad surface and said trailing rail surface are separated from each other by a groove.

16. The magnetic head slider according to claim 15, wherein the depth of said groove is almost equal to the depth of said deep groove surface.

17. The magnetic head slider according to claim 15, wherein the angle of inclination of a slant surface from an end of said trailing pad surface up to a bottom surface of said groove on said trailing rail surface side on said both sides is equal to or larger than about 0.002°.

18. The magnetic head slider according to claim 15, wherein said groove is a part of said deep groove surface.

19. The magnetic head slider according to claim 12, further comprising side step bearing surfaces on both sides of said air bearing surface, said side step bearing surfaces extending from said leading-side step bearing surface to a trailing edge side.

20. The magnetic head slider according to claim 12, wherein said trailing rail surface is divided to a front trailing rail surface and left and right trailing rail surfaces by said trailing-side step bearing surface.

21. The magnetic head slider according to claim 12, wherein said trailing rail surface has a central portion and two end portions extending in a direction of said trailing-side step bearing surface, the two end portions disposed on opposite sides of the central portion.

22. The magnetic head slider according to claim 12, wherein said trailing rail surface has a central portion extending in a direction of said trailing-side step bearing surface.

23. The magnetic head slider according to claim 12, wherein said trailing rail surface comprises trailing side rail surfaces extending from both sides of said leading step bearing surface to both sides of said trailing pad surface and a front trailing rail surface which provides a connection between leading sides of said trailing side rail surfaces, and said trailing-side step bearing surface is formed centrally with respect to said front trailing side rail surface.

* * * * *

UNITED STATES PATENT AND TRADEMARK OFFICE
CERTIFICATE OF CORRECTION

PATENT NO.        : 7,679,863 B2                                      Page 1 of 1
APPLICATION NO.   : 11/516828
DATED             : March 16, 2010
INVENTOR(S)       : Hashimoto et al.

It is certified that error appears in the above-identified patent and that said Letters Patent is hereby corrected as shown below:

In the Claims:

Claim 23, column 14, line 29, please delete "side rail surface"

and insert -- surface and said trailing side rail surfaces --

Signed and Sealed this

First Day of June, 2010

David J. Kappos
*Director of the United States Patent and Trademark Office*